Feb. 18, 1941.   H. VOHRER   2,232,153
DIAPHRAGM FOR DIALYSERS
Filed Nov. 23, 1938

Diaphragm of a polymerized vinyl composition.

Diaphragm of a polymerized vinyl composition attached to a netting.

Dialyser partition having a conduit attached.

Inventor
Herbert Vohrer,
By Bailey & Pearson
Attorneys

Patented Feb. 18, 1941

2,232,153

UNITED STATES PATENT OFFICE 2,232,153

DIAPHRAGM FOR DIALYSERS

Herbert Vohrer, Berlin, Germany

Application November 23, 1938, Serial No. 242,126
In Germany November 25, 1937

7 Claims. (Cl. 23—252)

My invention relates to dialysers for removing organic colloidal impurities from salt selections, particularly from strong alkaline lyes, as, used for example, in the production of artificial silk, and more particularly to the diaphragms or dialysing chambers of such dialysers as well as to the inlet and outlet conduits for the lye.

The diaphragms of such dialysers are usually made from pergament or from cotton fabric treated with an alkali, whereas the inlet and outlet conduits for the lye consist of rubber hose. It has been found that the efficiency of dialysers provided with such diaphragms is not very good, and that, besides, the life of such diaphragms is rather short. The same is true of the inlet and outlet conduits for the lye, and besides, leakages are often happening at the connection points of the conduits to the dialyser chambers.

The object of the invention is to increase the efficiency and to lengthen the life of dialyser diaphragms and dialyser chambers made from such diaphragms.

Another object of the invention is to provide a dialyser in which the diaphragm forming the walls of the dialysing chambers and the inlet and outlet conduits for the lye are made from one and the same material so that the conduits can be connected to the said chambers in a very simple manner by sticking, this connection being so secure and durable as to practically eliminate the possibility of leakages.

Further objects and advantages of the invention will appear more fully from the following description, particularly when taken in conjunction with the accompanying drawing which forms a part thereof.

According to the invention the dialysers are provided with diaphragms consisting of a polymerized vinyl composition, such as polyvinyl chloride, polyvinyl ether, and highly polymerized vinyl alcohols insoluble in cold water. The polymerized vinyl compositions are particularly adapted for the purpose because of their resistance to alkalies and their property to swell in water or aqueous solutions, this swelling being more or less intense according to the grade of polymerisation of the vinyl composition in question. The resistance of the polymerized vinyl compositions to water can be increased to any desired degree by methods well known in the art, for example, by treating them by sodium bichromate or any other tanning agent, or by heating them to about 170° C.

Figure 1:
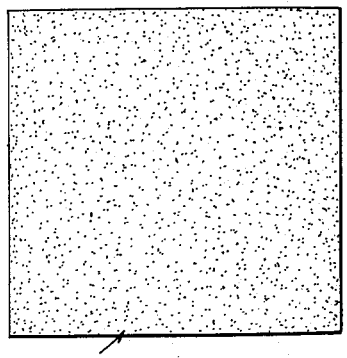
Fig. 1 shows in side elevation a form of diaphragm embodying the invention.
Figure 2:
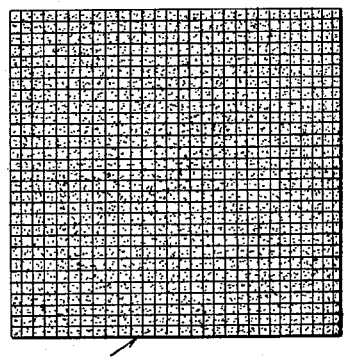
Fig. 2 is a similar view of a modified form of the invention.

The dialyser diaphragms or chambers according to the invention may consist of films made from the above mentioned material, either alone, (Fig. 1) or applied to a wire net or a woven fabric made from any vegetable fiber (Fig. 2).

An important advantage of the diaphragms according to the invention consists in that they enable to produce dialyser chambers in a very simple manner. Whereas hitherto such chambers had to be made by sewing pieces of fabric together, now it is possible to make the chambers by simply sticking together films or plates consisting of a polymerized vinyl composition with the aid of an aqueous solution of the same material.

Figure 3:
Fig. 3 is a transverse section through a further modification of the invention.

The inlet and outlet conduits for the lye can be made from the same material as the dialyser chambers, (Fig. 3) and they can also be connected to these chambers by sticking.

Having now particularly described and ascertained the nature of my said invention and in what manner the same is to be performed, I declare that what I claim is:

1. In a dialyser, a dialysing diaphragm comprising a highly polymerized vinyl composition.

2. In a dialyser, a dialysing diaphragm comprising polyvinyl chloride.

3. In a dialyser, a dialysing diaphragm comprising polyvinyl ether.

4. In a dialyser, a dialysing diaphragm comprising a highly polymerized polyvinyl alcohol.

5. In a dialyser, a dialysing diaphragm comprising a tanned polymerized vinyl composition.

6. In a dialyser, a dialysing diaphragm comprising a wire net having a film of a polymerized vinyl composition attached thereto.

7. In a dialyser, a dialysing diaphragm comprising a woven fabric of vegetable fibers and a film of polymerized vinyl composition attached thereto.

HERBERT VOHRER.